US006727890B2

(12) United States Patent
Andres et al.

(10) Patent No.: US 6,727,890 B2
(45) Date of Patent: *Apr. 27, 2004

(54) MODULAR KEYBOARD

(75) Inventors: Guillermo Andres, Pleasanton, CA (US); Edgardo Oriel Enriquez, Fremont, CA (US); Felix Guerra, San Jose, CA (US); Derek Thomas Newsom, Redwood City, CA (US); John Norman, San Jose, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 09/212,125

(22) Filed: Jan. 26, 1999

(65) Prior Publication Data
US 2002/0054024 A1 May 9, 2002

(51) Int. Cl.[7] .................................................. G09G 5/08
(52) U.S. Cl. .......................... 345/168; 345/156; 341/22
(58) Field of Search ................................ 345/168, 163, 345/156; 341/20, 21, 22; 400/489

(56) References Cited

U.S. PATENT DOCUMENTS

| 4,949,080 | A | * | 8/1990 | Mikan | 340/711 |
| 5,049,863 | A | * | 9/1991 | Oka | 345/156 |
| 5,144,302 | A | * | 9/1992 | Carter et al. | 341/20 |
| 5,615,083 | A | * | 3/1997 | Burnett | 361/686 |
| 5,699,059 | A | * | 12/1997 | Hiller | 345/168 |
| 5,793,355 | A | * | 8/1998 | Youens | 345/161 |
| 5,865,546 | A | * | 2/1999 | Ganthier et al. | 345/168 |
| 5,896,125 | A | * | 4/1999 | Niedzwiecki | 345/168 |
| 6,040,977 | A | * | 3/2000 | Hoffer | 345/168 |
| 6,081,207 | A | * | 6/2000 | Batio | 341/20 |
| 6,317,061 | B1 | * | 11/2001 | Batra et al. | 341/22 |

* cited by examiner

Primary Examiner—Amare Mengistu

(57) ABSTRACT

A computer user interface device is provided, made up of modules having separate sets of user interface features. For instance, a keyboard device has a first module bearing standard alphanumeric and control keys, and a second module, selected from a set of optional modules bearing specialized features such as multimedia controls, communication interfaces, or magnetic media readers. The modules are mechanically coupled together. An electrical interface allows user input signals, such as keystroke signals, to be consolidated on one module, preferably the specialized module, into a single signal stream, for coupling to the computer.

12 Claims, 9 Drawing Sheets

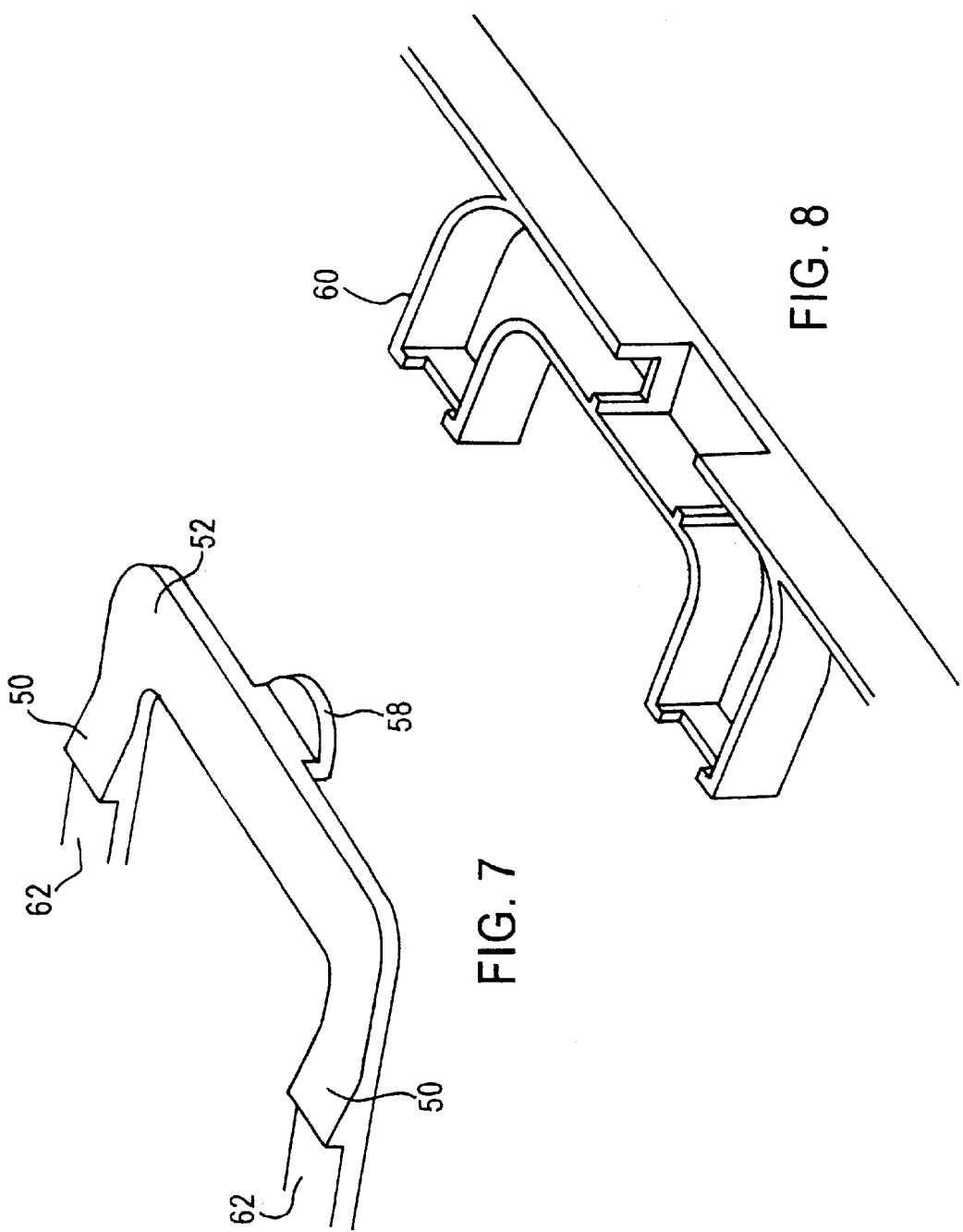

MODULAR KEYBOARD

FIELD OF THE INVENTION

The invention generally relates to the field of computers. More specifically, the invention relates to user interface equipment for use with computers. The invention has particular applicability to keyboards.

BACKGROUND OF THE INVENTION

Computer user interface devices, such as keyboards, have features which have not changed much in several decades, such as alphanumeric keys in the standard QWERTY character arrangement. However, keyboards have also included an increasing variety of newer, more computer- or application-specific features, as the capabilities of the computers have increased. For instance, separate numeric keypads and function keys (F1, F2, etc.) which came into use with IBM compatible computers in the 1980s have become ubiquitous.

More recently, however, the capabilities of computers have expanded so much that a wide variety of other user interface devices may advantageously be used. One way of utilizing such capability is to provide a user with a workstation having a variety of peripheral devices. This arrangement has the drawbacks of high total cost for all the interface devices, and great space requirements.

A solution to these drawbacks would be to integrate these additional features into keyboards. However, keyboards with numeric keypads and function keys are already large enough that they take up a great deal of desk space. These problems will only get worse as more and more functions are designed into keyboards.

Moreover, manufacturers most allow for the added costs of designing such added-feature keyboards. Such costs must, unfortunately, be passed on to customers. Additionally, where a variety of different types of new keyboard functions are to be provided; manufacturers must provide a disadvantageously large number of different keyboard models, each one incorporating the standard keyboard features as well as the particular set of new features the buyers of that model of keyboard will by using.

Accordingly, there is a need for a new approach to keyboard design, according to which added features are provided to users, on manageably sized keyboards, for which design and manufacturing costs are kept under control.

SUMMARY OF THE INVENTION

There is provided, in accordance with the invention, a computer user interface device, made up of modules having separate sets of user interface features. For instance, a keyboard device has a first module bearing standard alphanumeric and control keys, and a second module, selected from a set of optional modules bearing specialized features such as multimedia controls, communication interfaces, or magnetic media readers. The modules are mechanically coupled together. An electrical interface allows user input signals, such as keystroke signals to be consolidated on one module, preferably the specialized module, into a single signal stream, for coupling to the computer.

A user interface device in accordance with the invention allows a user to select a combination of features, such as standard keyboard features plus specialized features such as multimedia controls, to suit the user's specific needs. Upgrading is easy and inexpensive for the user, since only the appropriate module need be replaced.

For the manufacturer, there is a decreased need for a catalog of different types of keyboards, and for an inventory of each. Introducing a new model of one of the modules is relatively easy for the manufacturer, since there is no need to retool a whole keyboard. Therefore, the manufacturer enjoys cost savings.

BRIEF DESCRIPTION OF THE DRAWINGS

FIGS. 7 and 8 are perspective views showing details of the locking mechanism of FIG. 6.

DETAILED DESCRIPTION OF THE PREFERRED EMBODIMENTS

Broad Applicability of the Invention; Definitions

Figure 1:
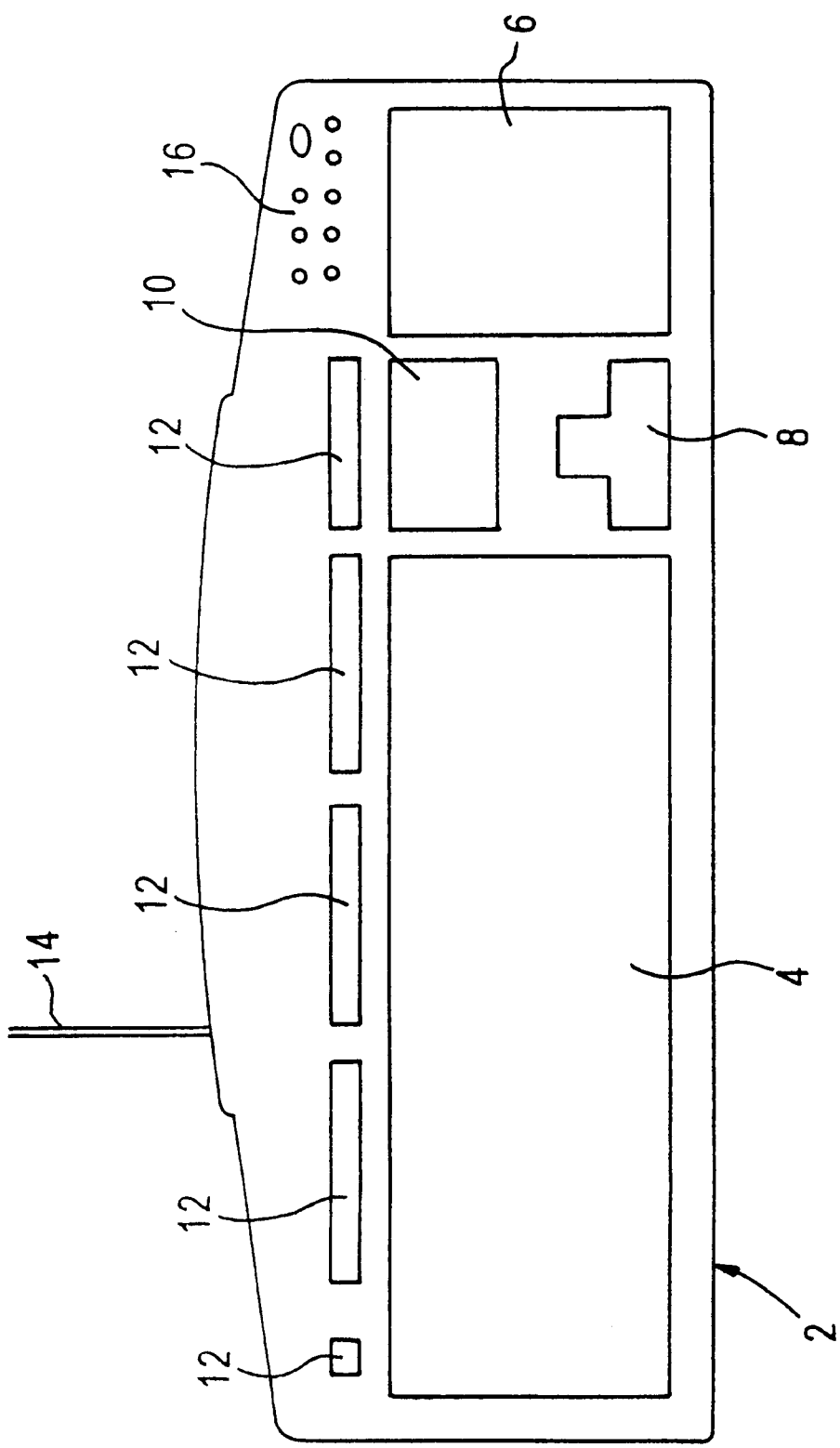
FIG. 1 is a top view of a conventional user interface device.

The invention has broad applicability to user interface apparatus, for use with computers or computerized equipment. In such user interface apparatus, the user provides input information, commands, etc., for a variety of different applications, using a variety of different types of input apparatus.

The invention provides a way of modularizing, and compacting, the user interface equipment necessary for such user input. In general, the greater the complexity of the user input, or the more complex or sophisticated the user interface equipment is the more advantageous it will be to apply the broad idea of the invention to such equipment.

The term "feature" is used herein to refer to any distinct user control which the user manipulates to product a signal, distinct from signals produced by user manipulation of other features. For instance, on a keyboard, each key is a distinct feature, and produces a distinct key symbol code signal responsive to being depressed by the user. The signals are preferably part of an "alphabet" or set of signals having certain common characteristics, which facilitate transmission over a communication cable to a computer. For instance, the key symbol code signals might be based on different symbols within the familiar ASCII or EBCDIC codes. It is well known that keyboards are commonly designed based on a keyboard matrix, wherein circuitry is employed within a user interface device or module for generating such code signals based on signals from keys within the keyboard matrix.

The sets of user input features are implemented on user interface modules. The modules are coupled together for the user's use. Also, a common interface is provided for communication between the computer, etc., and the overall user interface device thus produced. The common interface carries a signal stream based on user input signals from all of the modules. Preferably, the common interface is provided on one of the modules, and the other modules communicate through that module.

In general, it is possible for the invention to allow the user to pair up any two different sets of user interface features implemented on respective modules. Also, three or more sets of features, on three or more respective modules, may be grouped together for the user.

None of the modules, and none of the respective sets of features, need necessarily be given priority over the others, or be regarded or characterized as "standard" as opposed to "optional." However, the invention has particular applicability to user interface devices in which there is a basic set of user input features which will be available in all or most cases, and there is also a selection of different sets of optional additional features which are used along with the basic set of features.

As one example, the discussion which follows will focus on computer keyboards. It will be understood however, that other types of user interface apparatus, such as control panels, instrument panels such as automobile dashboards, etc. may also advantageously employ the invention.

The keyboard example illustrates a case in which the user is provided with a combination of features first set of features (the alphanumeric and control keys of a standard keyboard) which will in virtually all cases be provided, and a second set of features, selected by the user from different sets, based on the user's needs. For instance, if the user doesn't need multimedia controls but does need a smart card reader, the user will omit the multimedia controls and only take the smart card reader. Other users by contrast, might well prefer to have multimedia controls along with their standard keyboard features.

For convenience, the discussion of the keyboard example given below will refer to a "standard module" (such as the keyboard) and "specialty modules" (such as the multimedia controls or the smart card reader) in connection with the distinction between the basic keyboard features on the former and the various types of other features on the latter.

FIG. 1: A Prior Art Computer Keyboard Device

FIG. 1 is a simplified top view of a conventional computer keyboard 2. A basic typewriter-style alphanumeric keyboard 4 is provided. It has become common practice for computer keyboards additionally to include a numeric keypad 6, directional cursor movement keys 8, fixed control keys 10 (for instance, "HOME", "PAGE UP", "PAGE DOWN", etc.), and programmable function keys 12 ("F1", "F2", etc., which have different functions depending on the application in which they are used).

Generally, such keyboards are implemented as a matrix of contact switches. When a key is depressed, an electrical code signal, specific to the depressed key's position in the matrix, is generated. According to a standard keyboard communication protocol the signal is sent through a cable 14 to the computer.

Conventionally, if additional features are to be added to such a keyboard, they must be built into the keyboard, essentially as it exists. For instance, if additional multimedia controls are to be added, they must be located on available keyboard real estate. As shown, additional controls 16 are positioned on the keyboard.

Such an arrangement has the drawbacks given above, that the keyboard must be redesigned and retooled, at additional cost, and the manufacturer must deal with a specialized model of keyboard, expanding the manufacturer's product catalog and inventory. Also, the specialized keyboard inherently attracts a relatively small part of the market, so the manufacturer is unable to take advantage of economies of scale.

Figure 2:
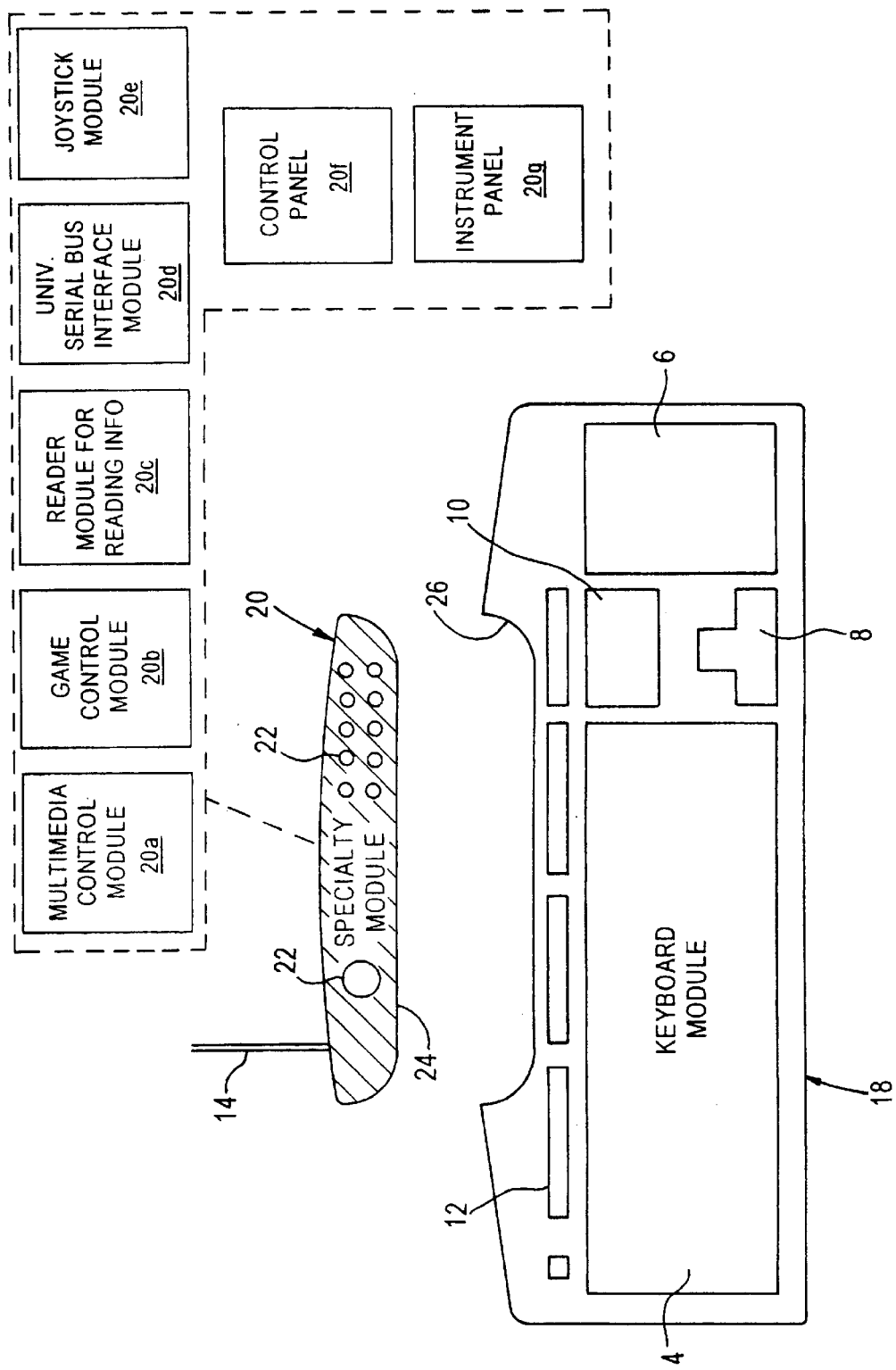
FIG. 2 is an exploded top view of a user interface device according to the invention.
Figure 3:
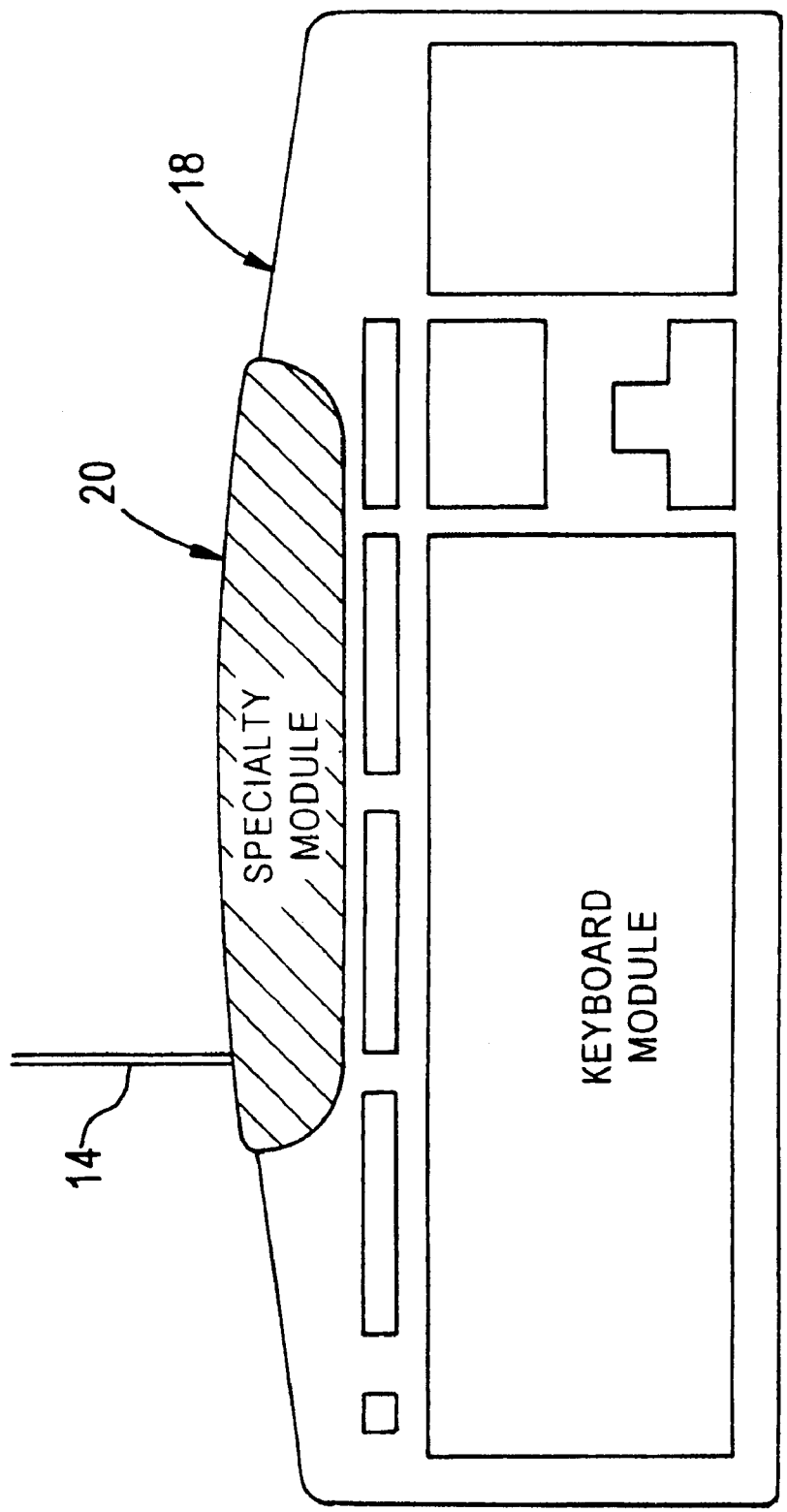
FIG. 3 is a top view of the user interface device of FIG. 2, assembled.

FIGS. 2 and 3: A Computer Keyboard Device According to the Invention

In accordance with the invention, user interface features to be provided to the user are divided into groups, for instance two groups. The groups of features are implemented on separate modules. The modules include coupling structures for mechanically and electrically coupling themselves together into a user interface device. Preferably, the physical designs of the various modules are such that the user perceives the user interface device as a single unit.

Also, preferably the user perceives the features on the various modules as bring generally similar to, and compatible with, each other. For instance, if two modules are both keyboard modules, for instance one having the basic alphanumeric keyboard and the other having a set of control keys, the keys are preferably all the same size and shape. That is, it would be considered less preferable if one of the nodules had typewriter-style keys and the other had calculator-style keys. However, the spirit and scope of the invention would cover even such an arrangement.

The invention has particular applicability to computer keyboards. To illustrate an example of the invention, FIG. 2 shows an exploded view of a two-module keyboard device. A first module 18 includes the basic typewriter-style alphanumeric keyboard 4, numeric keypad 6, directional cursor movement keys 8, fixed control keys 10 and programmable function keys 12, similar to those of FIG. 1.

Also shown is a second module 20, which bears a set of features 22. In the exploded view of FIG. 2, the modules 18 and 20 are separated. However, their physical designs schematically illustrate a cooperative mating compatibility. In this case, a convex side 24 of the module 20 matches a concave side 26 of the module 18. Of course, numerous other shapes, designs, etc., may be employed to provide cooperative mating compatibility between modules according to the invention.

In FIG. 3, the modules 18 and 20 are shown as coupled together. That is, the convex side 24 abuts the concave side, where the modules 18 and 20 are mechanically coupled. The coupling will be discussed further below.

"Standard"Versus "Optional" Features

Broadly, the module 18 may simply be referred to as a "first" module, for distinguishing it from the "second" module 20, or from other modules to be used in assembling a user interface device. The features on the modules 18 and 20 may be regarded simply as first and second sets of features, without making a distinction between importance or width of applicability of the different sets of features. The second module 20 is a specialty module which can be selected from a set of specialty modules including a multimedia control module, a game control module, a reader module for reading information stored on a storage module, a universal serial bus (USB), interface module and a joystick module.

However, a keyboard is an example of a situation in which one set of features may be regarded as standard, or basic, or generally applicable; while another set (or other sets) of features may be regarded as extra, or optional. For instance, the basic alphanumeric keyboard 4 is basic, going all the way back to typewriters, and the keys 6, 8, 10, and 12 are so commonplace on computer keyboards, and so frequently provided along with the keys 4, that they also may be regarded as standard or basic.

However, other sets of features, which may be included in keyboards, are not as basic. Such features may include multimedia function keys, a smart card reader, a Universal Serial Bus hub, extended ports; game controls such as a joystick, and controls for communication protocols such as 1394. Current market trends are to make such additional functionality available to the user, and adding more functionality to the keyboard is a way of doing so which makes the functionality conveniently available to the user. However, different users will have different requirements for this additional functionality.

Modules, in addition to providing different sets of user interface features, can also provide different functionality not directly visible to the user. For instance, the communication between the user interface device and the computer can be implemented in different ways by different modules. Two such communication protocols are the newer USB protocol, and the more venerable PS2 protocol. Different modules may implement these different protocols. For instance, in the example of FIGS. 2 and 3, the communications cable 14 is directly coupled to the module 20. Accordingly, different modules 20 include electrical implementations of different communications protocols. The user selects a particular one of the modules 20 based on which protocols is desired. The different modules include, as illustrated in FIG. 2, a multimedia control module 20a, a game control module 20b, a reader module for reading information stored or a storage module 20c, a universal serial bus interface module 20d, a joystick module 20e, a control panel 20f, and an instrument panel 20g.

The modular user interface structure in accordance with the invention provides the benefit that the end user can easily and inexpensively upgrade the functionality of the keyboard, merely by purchasing and installing a module bearing the features the user requires.

The manufacturer will benefit in that the keyboard module 18 is a high-volume, standard product which may be manufactured in quantities commensurate with the widespread need for keyboards. This advantageously reduces the complexity of the manufacturer's supply chain, because there is not a need for having multiple keyboards in the manufacturer's product line. This is generally true where users will require combinations of features from a selection of different modules, but is particularly true where all or most users include a common, standard feature set in their user interface configurations. Having one common base keyboard and different optional add-on modules, versus a menu of different integrated keyboards, allows a configure-to-order scenario that reduces inventory levels.

Also, the development time of a module is likely to be less than that of a whole keyboard, so modularity as per the invention reduces the development cycle from that for new keyboards. When new technologies are introduced, flexibility is increased, both for the manufacturer and for the user. For instance, the user can upgrade the communication protocol from PS2 to USB by simply purchasing the different module, and coupling it to the module 18.

Figure 5:
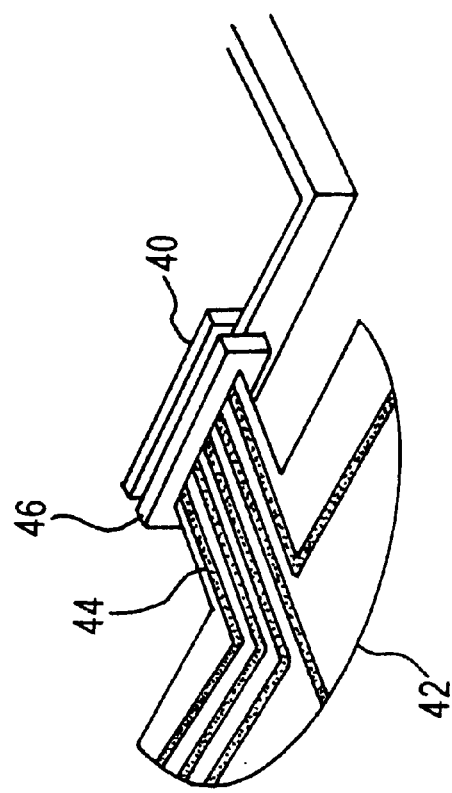
FIG. 5 is a more detailed perspective view of a portion of the coupling structure of FIG. 4.
Figure 4:
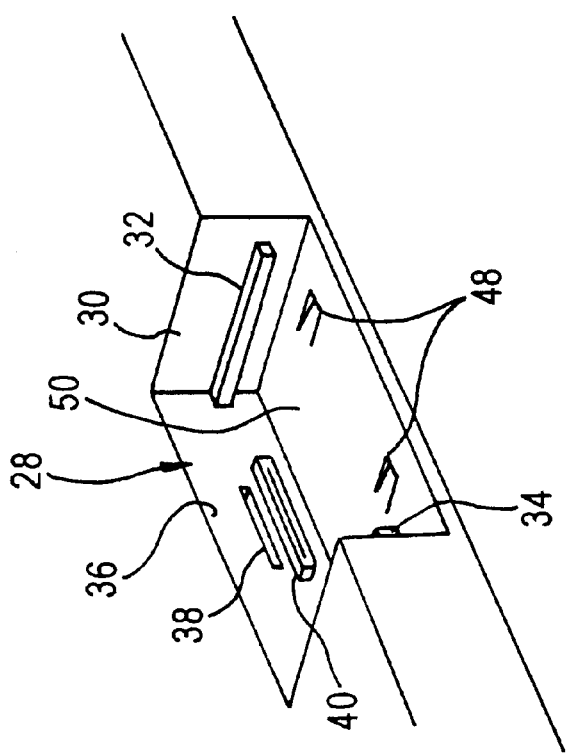
FIG. 4 is a detailed perspective view of a module coupling structure in accordance with the invention.

FIGS. 4, 5: Module Coupling Structures

From the foregoing, it will be understood that suitable mechanical and electrical coupling is employed when a user interface device is being put together out of modules in accordance with the invention. Persons skilled in the art will readily understand that there are numerous ways in which this may be done. However, preferred implementations will now be discussed.

FIG. 4 shows a portion of one of the modules, preferably the first (base) module 18, the portion bearing a module coupling shown as a cavity 28. The cavity 28 has a predetermined shape, such as the rectangular prism shown. Another module, which is to couple with the module illustrated, includes a corresponding coupling structure for mating with the coupling structure shown, by insertion into the cavity 28.

Physical alignment structures are provided on interior surfaces of the cavity 28. For instance, on a side interior surface 30 and an opposite side interior surface not visible in this perspective view, guide rails 32 and 34 are provided. The guide rails 32 and 34 engage corresponding guide slots on the corresponding coupling structure of the other module. Also, on an outward facing side 36 or the cavity 28, an alignment structure shown as a slot 38 is provided for receiving a corresponding alignment tab.

The modules are electrically coupled through a connector 40 on the outward facing side 36, and a corresponding connector on the coupling structure of the other module.

FIG. 5 shows a more detailed view of the electrical coupling. The connector 40 is shown. Also shown is a circuit-carrying member such as a circuit board 42, which is included with the coupling structure of the other module. Circuit lines 44 run to a connector 46. When the modules are coupled, and the coupling structures are properly aligned by the alignment structures, the connectors 46 and 40 engage each other, providing the electrical coupling.

FIG. 4 additionally shows a locking structure for securing the mechanical coupling between the modules. The locking structure is preferably implemented as spring-loaded, user-manipulable snaps, which snap into a locking position when the modules are coupled, and which release when the user, decoupling the modules, presses the snaps against their spring bias.

In FIG. 4, snap recesses 48 are shown on a side interior surface 50 of the cavity 28. Spring-loaded snaps on the corresponding coupling structure align with the snap recesses 48, and the spring biasing on the snaps causes the snaps to move into the snap recesses 48, to hold the coupling structures together.

Figure 6:
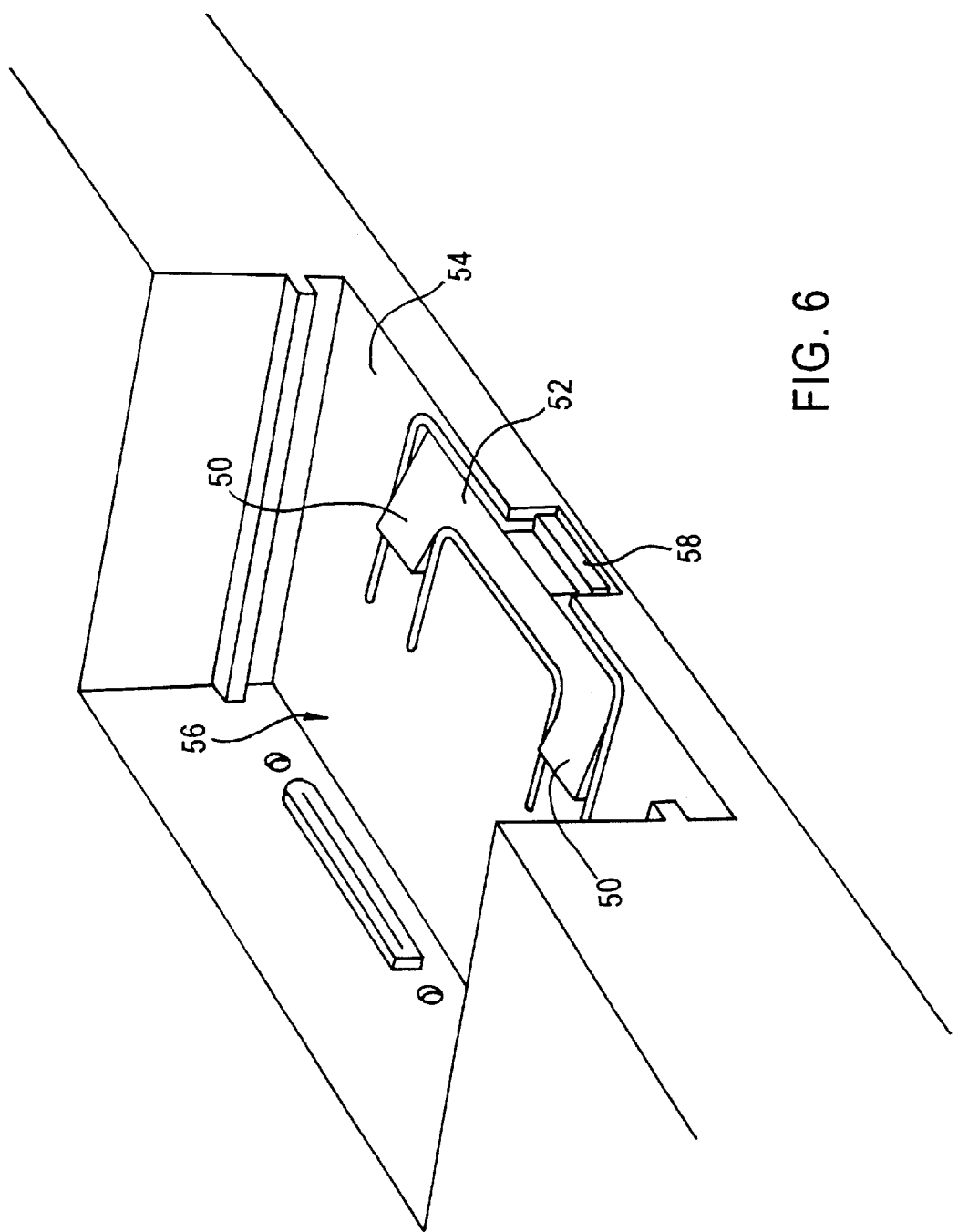
FIG. 6 is a perspective view of a module locking mechanism for use with module coupling in accordance with the invention.

FIGS. 6, 7, and 8: Mechanical Coupling Structures

Further illustrations of spring-loaded snap structures are shown in FIGS. 6, 7, and 8. It will be understood that snaps and snap recesses are complementary, and that either one may be positioned on either of the modules to be coupled. Therefore, for ease of illustration, snaps will be shown in FIGS. 6, 7, and 8. It will be understood that snap recesses, similar to those shown in FIG. 4, are provided on the corresponding coupling structure which engages that of FIGS. 6, 7, and 8.

In FIG. 6, snap locks 50 are provided on a snap member 52 on a side interior surface 54 of a coupling structure cavity 56, generally similar to the cavity 28 of FIG. 4. The snap locks 50 project above the surface of the side interior surface 54, to engage snap recesses in the other module, similar to the snap recesses 48 of FIG. 4. The snap member 52 is held in that position by a biasing force.

The snap member 52 also has a user manipulable snap lock tab 58. When the user depresses the tab 58, the biasing force is overcome, the snap locks 50 recede out of the snap recesses, and the modules are released from each other.

Any suitable means may be used for providing the biasing force. For instance, the snap member 52 may be positioned inside a receptacle 60 (FIG. 8). Bias members such as springs are placed inside the receptacle 60, to urge the snap member 52 toward its bias position.

Alternatively, the snap member may be held stationary at a fulcrum, so that its own rigidity biases it into position and user manipulation of the snap member causes it to move, by leverage, out of the bias position. For instance, the snap member 52 of FIG. 7 might be held rigidly at ends 62. Then, downward force exerted against the tab 58 causes the snap locks 50 to recede.

The mechanical coupling is preferably associated with the coupling structure (e g., the cavity 56), as shown. However, it is also possible to have a coupling structure, generally similar to the cavity 56, which is limited to the electrical coupling. Then, mechanical coupling, such as the spring locks, is provided at any suitable surface region at which the modules engage each other. For instance, spring locks may be provided at a general coupling surface, such as the convex and concave surfaces 24 and 26 of the modules of FIGS. 2 and 3.

Figure 9:
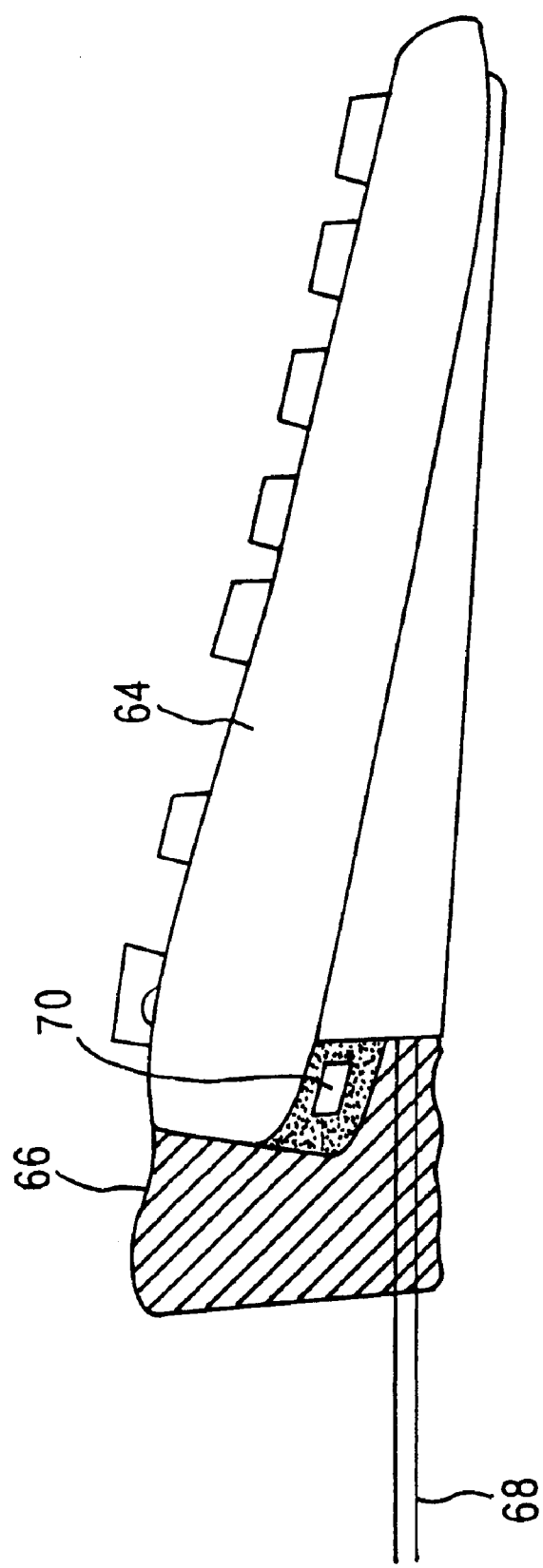
FIG. 9 is a side view of a keyboard user interface device according to the invention.

FIG. 9: Additional User Interfaces

Preferably the optional module includes additional interfaces to supply signals to the user, as appropriate. For instance, a multimedia module might include a headphone jack, accessible on the top or side of the multimedia module, for allowing the user to listen to audio signals with headphones. Alternatively, additional user interface devices, such as a mouse, tablet, etc., may be connected to the optional module in similar fashion.

FIG. 9 is a side view of a keyboard device according to the invention. Essentially as shown in FIG. 3, a basic keyboard module 64 is coupled with an optional module 66. The optional module 66 is positioned at a side of the basic keyboard 64 facing away from the user. As discussed above, the optional module 66 consolidates the user input signals, and provides a signal stream to the computer through a cable 68.

Note, however, that an additional interface port 70 is provided from the optional module 66. For instance, if the optional module 66 is a multimedia module, then the interface port 70 may be a headphone jack. The user easily reaches around the side and back of the keyboard 64, to access the jack 70 and plug in headphones.

Additional user interfaces for other purposes, suitable for other types of optional modules, would work similarly.

Electrical Coupling Between Modules, and to the Computer

It is preferred that, whatever the configuration of the user interface device according to the invention, i.e., whatever modules and features are coupled to make up the user interface device, the final resultant device be interfaced with the computer in the same manner as an ordinary user interface device would be.

Specifically, a keyboard device made up of several modules, as described above, should nevertheless have a single interface to the computer, and that interface should be in accordance with a standard interface protocol.

In general, this may be accomplished by providing electrical interfaces between the modules, and consolidating the user interface input information, such as keystroke information, into a single signal stream at one of the modules. That module then sends the signal stream to the computer. For instance, the module 20 of FIG. 2 includes such consolidation circuitry, and provides the signal stream over the cable 14 to the computer.

Where the different modules are all about equal in user desire (such as modules bearing a standard alphanumeric keyboard and a bank of F1-type control keys, respectively), it would not be essential which module bore the consolidation circuitry.

However, where one module is more general purpose and the other module is more application-specific, it is preferred that the consolidation circuitry be on the latter module. Consider, for instance, a keyboard. All basic keyboard functions work essentially the same way. However, if the user has a choice between, for instance, a multimedia control panel and a smart card reader as an optional addition to a basic keyboard, the two optional modules are likely to produce different types of signals, which behave according to different protocols. If the consolidation circuitry resided on the basic keyboard, there would need to be circuitry for both the multimedia control panel and the smart card reader. For whichever optional module was not used, the signal consolidation capability would be superfluous, adding undesirable cost and complexity to the basic keyboard.

If, on the other hand, the signal consolidation circuitry were on the optional modules, then a simplifying assumption may be made, that one optional module does not need another optional module's capability. Each optional module needs only its own capability and that of the basic keyboard.

Accordingly, for an electrical interface such as that of the connectors 40 and 46 of FIG. 5, the basic keyboard simply provides its matrix keystroke signals, through the connectors, to the optional module. The optional module integrates the provided signals with its own, whether from its own keys, or from dials, card readers, etc., to produce a total signal stream. That signal stream is then provided through the interface cable to the computer.

The optional module includes whatever circuitry is appropriate for this task. For instance, it may include logic circuitry, potentiometers or analog-to-digital samplers for dials, magnetic sensing circuitry for magnetic medium readers such as card readers, etc. Also, optional keyboard driver software may be used on the computer for interpreting the signals produced by the optional module's circuitry.

Figure 10:
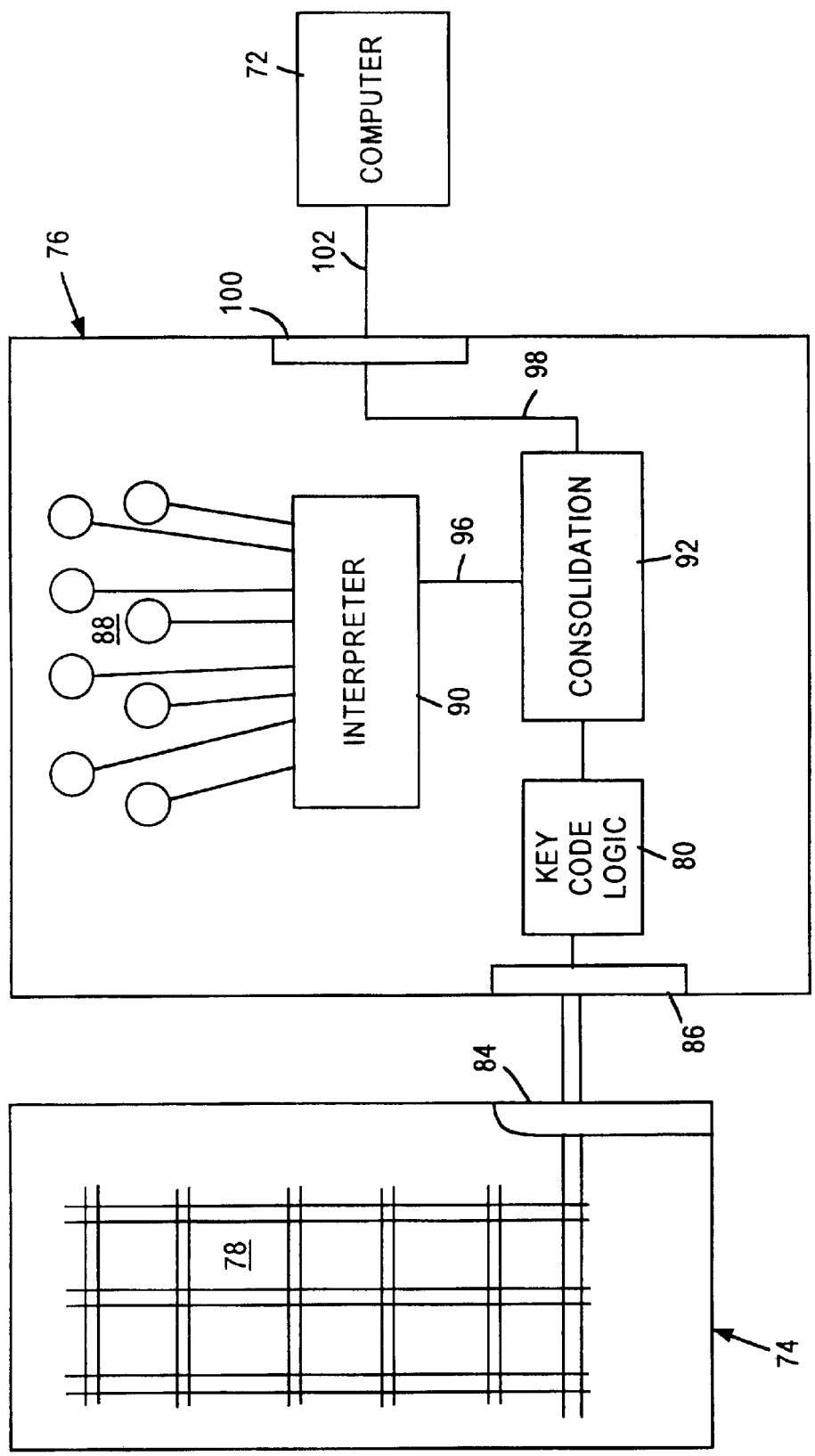
FIG. 10 is a block diagram showing electrical components and circuitry used in accordance with the invention.

FIG. 10: An Example of Electrical Coupling Circuitry

An example of such circuitry is shown, in detailed block diagram form, in FIG. 9

The block diagram includes three major components, a computer 72, a first module 74 shown as a standard keyboard module, and a second module 76 shown as a specialty module bearing controls suitable for the user's special needs.

Signals from the First Module 74

The keyboard module 74 is substantially similar to a conventional keyboard. User input features, in this case typewriter-style keys, are designed and laid out in accordance with a key matrix, shown schematically as a matrix 78. When depressed, the keys generate key signals on the matrix 78.

The key signals are provided to a module connector 84. When the modules are coupled for operation, the connector 84 is coupled to a connector 86 on the module 76.

In accordance with the invention, the key signals are provided from the connector 86 to key code logic circuitry 80, which operates in known fashion to generate key code signals, preferably in accordance with a standard protocol, such as a serial code protocol.

Accordingly, the matrix 78 makes up circuitry for producing a first set of user function signals, responsive to user input. Further, the first module 74 may be regarded as a module for producing such first signals.

In the example shown, the key code logic circuitry 80 resides on the second module 76. However, in alternative embodiments, the key code logic circuitry 80 or equivalent circuitry could reside on the first module 74. In such a case, the matrix 78 and the key code logic circuitry 80 together would make up the circuitry for producing a first set of user function signals, responsive to user input.

Signals from the Second Module 76

The module 76 likewise has user input features, in this case shown as controls 88. In the illustrated example, the module 76 is a specialty module. Only a subset of users who would use the keyboard module 74 would use this particular module 76. Other users will have selected different modules from among those available for use with the keyboard module 74.

Again, it will be understood that, depending on the type of module, the user inputs may be data-related, rather than control-related. For instance, the user input features 88 may include a smart card reader for inputting data read from a card.

User input signals from the features 88 will vary, depending on the type of features 88 provided. Since the key code signals are in a standard format, building a single signal stream will likely require modifying the signals from the features 88 for some suitable level of compatibility with the key code signals.

To this end, interpreter circuitry 90 is provided. The term "interpreter" is broadly construed to refer to any circuitry, electromagnetic components, electromechanical components, etc., which takes user input, regardless of the user input's form or nature, and produces from the user input a signal. The interpreter 90 is specific to the type of input. Several examples will be given here, and others will occur to those skilled in the art, based on this disclosure.

For a card reader, the interpreter 90 includes circuitry for converting magnetic head data to electrical signals, in a manner similar to that conventionally used with card readers, magnetic tape heads, and other magnetic pickups. For multimedia controls, the interpreter 90 may include potentiometers, or the like, for producing a signal responsive to the user turning a dial. If the features 88 include user-depressible keys similar to keyboard keys, coding similar to that of the key code logic circuitry 80 is provided. Also, analog-to-digital sampling circuitry may be provided.

Accordingly, electrical circuitry of the features 88, and the interpreter 90, together make up circuitry for producing a second set of user function signals, responsive to user input. Further, the second module 76 may be regarded as a module for producing such second signals.

Consolidation of Signals

At this point, there are two sets of signals, which have been made suitably compatible with each other by the key code logic circuitry 80 and/or the interpreter 90. Both are provided to consolidation circuitry 92, the key code signals from the module 74 over a bus 94, and the signals from the interpreter 90 over a bus 96.

The consolidation circuitry 92 combines the two signals to produce a single stream. This is done through multiplexing, modulation, or other suitable technique. As necessary, the consolidation circuitry 92 may also include further signal modification circuitry, such as scaling circuitry or additional code translation circuitry.

In general, the key code logic circuitry 80 and the interpreter 90 include respective circuitry, etc., which is suitable for producing signals in forms which are compatible with each other.

"Compatibility" here, broadly means that the signals are in a form where they can be transmitted over a common communications medium, or in the same, equivalent, or similar communications protocols. Compatibility, thus construed, will be determined according to the particular types of devices used, and as per the judgment of the person, skilled in the communications arts, who is designing and implementing the user interface device according to the invention.

Then, the single signal stream is provided over a bus 98 to communication interface circuitry 100, such as a USB or PS2 interface device, or a UART. The communication interface circuitry 100 provides the signal stream over a cable 102 to the computer 72.

As shown, circuitry specific to a particular set of features, such as the key code logic circuitry 80 and the interpreter 90, is located on the appropriate module. Also, the consolidation circuitry 92 is preferably designed specifically for the sort of signals it is to receive and consolidate. For advantageous cost savings, the consolidation circuitry 92 avoids having capabilities for dealing with signals it will not receiving. Therefore, it is preferred that the consolidation circuitry is located on a specialty module, such as the module 76, rather than on a general or standard module, such as the keyboard module 74. Accordingly, the user may change or upgrade the system's capabilities merely by replacing the module 76 with an upgraded or different module. It is also possible to upgrade the functioning of the module 76, merely by replacing the interpreter 90 with an upgraded component, that offers different, or better function capabilities.

Figure 11:
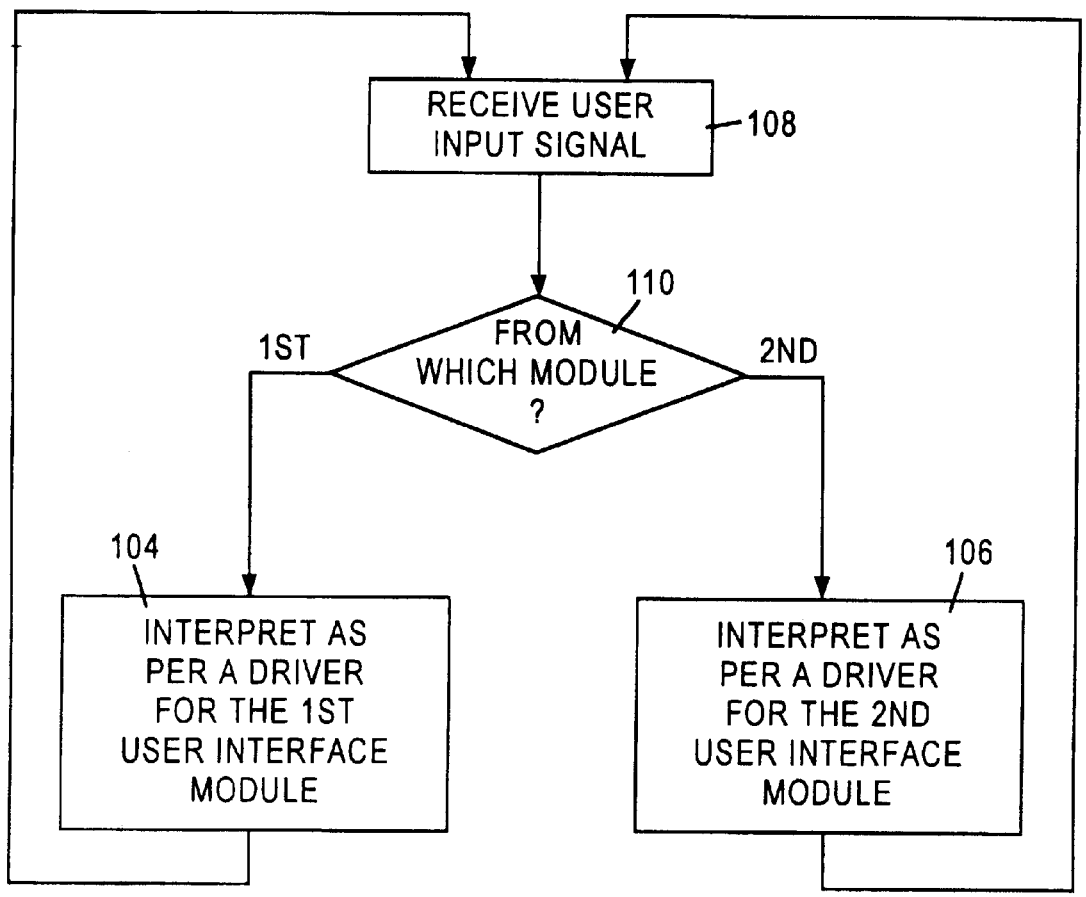
FIG. 11 is a high-level flowchart showing the operation, by a computer, of a software driver for use with a user interface device according to the invention.

FIG. 11: Software Driver for Use with User Interface Device According to the Invention Conventionally, the computer 72 runs a suitable keyboard driver program for receiving key code signals from the keyboard. In accordance with the invention, such a driver includes software for distinguishing which module a given signal originated from, interpreting that signal in accordance with the particular function and feature of the module of origin, and for operating in accordance with that interpretation of the signal.

FIG. 11 shows a high-level flowchart of such a driver, for a user interface device made of two modules. Conventionally, user interface devices which function the same way as the two modules do have drivers which essentially perform the functions if the respective blocks 104 and 106, respectively. Operational details would be understood by persons skilled in the art, and are thus omitted.

In accordance with the invention, when a signal is received (block 108) from the signal stream over the cable 102, the computer 72 identifies which module the signal originated from (block 110). How this is done depends on how the consolidation circuitry 92 produced the signal stream. Persons skilled in the art will know of numerous possible techniques, but a few possibilities will be given.

For digital signals, the consolidation circuitry 92 may add a packet header, identifying the module of origin, to a signal. Then, step 110 simply involves reading the packet header. Multiplexing techniques, such as frequency- or time-division, may be used.

For analog signals, amplitude or phase differences, etc., are possible techniques for distinguishing the module of origin.

What is claimed is:

1. A computer user interface device, for use by a user for communicating information to a computer, the user interface device comprising:
   a first module for producing a first set of user function signals based on user input operations;
   a second module for producing a second set of user function signals based on user input operations, wherein the second module is selected from a set of specialty modules including:
   (i) a multimedia control module;
   (ii) a game control module;
   (iii) a reader module for reading information stored on a storage module;

(iv) a Universal Serial Bus (USB) interface module; and (v) a joystick module means for coupling the first module with the second module; and circuitry for coupling the first and second user function signals to the computer.

2. The computer user interface device of claim 1, wherein the computer user interface device is one of a computer keyboard device, control panel and instrument panel.

3. The computer user interface device of claim 1, wherein said keyboard module includes directional cursor movement keys and programmable function keys.

4. A computer user interface device, for use by a user for communicating information to a computer, the user interface device comprising:

a first module for producing a first set of user function signals based on user input operations;

a second module for producing a second set of user function signals based on user input operations;

means for coupling the first module with the second module;

circuitry for coupling the first and second user function signals to the computer, wherein the circuitry for coupling the keyboard keys symbol code specialty and user function signals to the computer includes:

circuitry on one of the keyboard and specialty modules, for producing one of said keyboard and specialty user function signals from one module;

circuitry on the other of the keyboard and specialty modules, for producing one of said keyboard and user input signals from the other module;

a first electrical coupling for providing the user input signals to the other module;

consolidation circuitry for producing a signal stream based on the keyboard and specialty user input signals; and a second electrical coupling for providing the signal stream to the computer.

5. The computer user interface device as recited in claim 4, wherein the circuitry for coupling the first and second user function signals to the computer includes:

circuitry on said specialty module for producing user input signals from the keyboard module and circuitry for producing user input signals from the specialty module;

a first electrical coupling for providing the user input signals from said keyboard module to the specialty module;

consolidation circuitry for producing a signal stream based on the keyboard and specialty user input signals; and a second electrical coupling for providing the signal stream to the computer.

6. The computer user interface device of claim 5, wherein said circuitry for producing user input signals from said keyboard module includes key code logic circuitry and said circuitry for producing user input signals from said specialty module includes an interpreter.

7. The computer user interface device of claim 4, further comprising a cable coupled to said consolidation circuitry located in said specialty module further comprising a cable coupled to said consolidation circuitry located in said specialty mode.

8. The computer user interface device of claim 4, wherein said circuitry for producing user input signals from said keyboard module includes key code logic circuitry and said circuitry for producing user input signals from said specialty module includes an interpreter.

9. The computer user interface device of claim 4, wherein the computer user interface device is one of a computer keyboard device, control panel and instrument panel.

10. The computer user interface device of claim 4, wherein said keyboard module includes directional cursor movement keys and programmable function keys.

11. A computer user interface device, for use by a user for communicating information to a computer, the user interface device comprising:

a first module for producing a first set of user function signals based on user input operations;

a second module cooperatively couplable to said first module for producing a specialized set of user function signals based on user input operations, wherein the second module is selected from a set of specialty modules including:

(i) a multimedia control module;

(ii) a game control module;

(iii) a wader module for reading information stored on a storage module;

(iv) a Universal Serial Bus (USB) interface module; and (v) a joystick module; and circuitry for coupling the first and second user function signals to the computer.

12. A computer user interface device, for use by a user for communicating information to a computer, the user interface device comprising:

a first module for producing a first set of user function signals based on user input operations;

a second module cooperatively couplable to said first module for producing a specialized set of user function signals based on user input operations; and circuitry for coupling the first and second user function signals to the computer, wherein the circuitry for coupling the First and second user function signals to the computer includes:

first circuitry on one of the first and second modules for producing first user input signals from the one module;

second circuitry on the other of the first and second modules for producing second user input signals from the other module;

a first electrical coupling for providing the first user input signals to the other module;

consolidation circuitry for producing a signal stream based on the first and second user input signals; and a second electrical coupling for providing the signal stream to the computer.

* * * * *